(12) United States Patent
Ye et al.

(10) Patent No.: US 9,217,825 B2
(45) Date of Patent: Dec. 22, 2015

(54) SPUN NON-CIRCULAR AND NON-ELLIPTICAL CORE OPTICAL FIBERS AND APPARATUSES UTILIZING THE SAME

(71) Applicant: nLIGHT Photonics Corporation, Vancouver, WA (US)

(72) Inventors: Changgeng Ye, Kirkkonummi (FI); Joona Koponen, Vantaa (FI); Thomas S. Sosnowski, Pinckney, MI (US)

(73) Assignee: nLIGHT Photonics Corporation, Vancouver, WA (US)

( * ) Notice: Subject to any disclaimer, the term of this patent is extended or adjusted under 35 U.S.C. 154(b) by 0 days.

(21) Appl. No.: 14/218,738

(22) Filed: Mar. 18, 2014

(65) Prior Publication Data

US 2014/0268310 A1    Sep. 18, 2014

Related U.S. Application Data

(60) Provisional application No. 61/800,970, filed on Mar. 15, 2013.

(51) Int. Cl.
*H01S 3/00*     (2006.01)
*G02B 6/02*     (2006.01)
*G02B 6/036*    (2006.01)
*H01S 3/067*    (2006.01)
*H01S 3/094*    (2006.01)
*H01S 3/0941*   (2006.01)
(Continued)

(52) U.S. Cl.
CPC  *G02B 6/02* (2013.01); *G02B 6/036* (2013.01); *H01S 3/06729* (2013.01); *H01S 3/06754* (2013.01); *H01S 3/06733* (2013.01); *H01S 3/09415* (2013.01); *H01S 3/094007* (2013.01); *H01S 3/1618* (2013.01); *H01S 3/302* (2013.01)

(58) Field of Classification Search
CPC ...... G02B 6/02; G02B 6/036; H01S 3/06754; H01S 3/06729; H01S 3/06733
USPC ................................ 385/123, 126; 359/341.1
See application file for complete search history.

(56) References Cited

U.S. PATENT DOCUMENTS

| 4,315,666 A | 2/1982 | Hicks, Jr. |
| 4,372,645 A | 2/1983 | Miller |
| 4,555,177 A | 11/1985 | Barrett |

(Continued)

OTHER PUBLICATIONS

Clark, "Temperature-stable spun elliptical-core optical-fiber current transducer," *Optics Letters*, vol. 18, No. 2, pp. 158-160 (Jan. 15, 1993).

(Continued)

*Primary Examiner* — Mark Hellner
(74) *Attorney, Agent, or Firm* — Klarquist Sparkman, LLP (57) ABSTRACT

Optical fibers are provided for modal discrimination which include a central core and a cladding disposed about the central core. The central core has a non-circular and non-elliptical cross-section, and it is rotated about a central axis of the optical fiber along the length of the optical fiber at a selected pitch resulting in the capability of a fundamental mode beam output for large core sizes. An optical system includes a seed optical source configured to provide a seed beam and an optical amplifier configured to receive and amplify the seed beam. The optical amplifier also includes an active optical fiber having a large mode area non-circular and non-elliptical core rotated about a central axis of said active optical fiber to provide modal discrimination and fundamental mode output.

18 Claims, 9 Drawing Sheets

(51) Int. Cl.
*H01S 3/16* (2006.01)
*H01S 3/30* (2006.01)

(56) References Cited

U.S. PATENT DOCUMENTS

| | | | |
|---|---|---|---|
| 6,422,043 B1* | 7/2002 | DiGiovanni et al. | 65/402 |
| 6,427,491 B1* | 8/2002 | Burke et al. | 65/403 |
| 6,480,637 B1 | 11/2002 | Yao | |
| 6,496,301 B1 | 12/2002 | Koplow et al. | |
| 7,424,193 B2 | 9/2008 | Galvanauskas | |
| 7,787,729 B2* | 8/2010 | Dong et al. | 385/123 |
| 7,809,224 B2 | 10/2010 | Galvanauskas | |
| 8,098,970 B2 | 1/2012 | Galvanauskas | |
| 8,351,111 B2 | 1/2013 | Di Giovanni et al. | |
| 8,406,594 B2* | 3/2013 | Alkeskjold | 385/125 |
| 8,582,609 B2 | 11/2013 | Tong et al. | |
| 2003/0118266 A1 | 6/2003 | Kopp et al. | |
| 2004/0246568 A1 | 12/2004 | Onaka et al. | |
| 2005/0238364 A1 | 10/2005 | Leonardus Jennen | |
| 2008/0101754 A1 | 5/2008 | Parker et al. | |
| 2009/0047014 A1 | 2/2009 | Irie | |
| 2009/0052840 A1 | 2/2009 | Kojima et al. | |
| 2009/0262761 A1 | 10/2009 | Khitrov | |
| 2013/0291603 A1 | 11/2013 | Nufern | |

OTHER PUBLICATIONS

Sosnowski et al., "3C Yb-doped Fiber Based High Energy and Power Pulsed Fiber Lasers," nLight Corporation, pp. 1-11 (Mar. 1, 2012).
Tjugiarto et al., "Couplings in spun twin-core optical fibers," *Optics Letters*, vol. 17, No. 15, pp. 1058-1060 (Aug. 1, 1992).
International Search Report and Written Opinion for International Application No. PCT/US2014/030698, mailed Oct. 14, 2014.
Wang et al., "Efficient single-mode operation of a cladding-pumped ytterbium-doped helical-core fiber laser," *Optics Letters*, vol. 31, No. 2, pp. 226-228 (Jan. 15, 2006).
Amans et al., "Vector modulation instability induced by vacuum fluctuations in highly birefringent fibers in the anomalous-dispersion regime," Optics Letters 30(9):1051-1053 (May 1, 2005).
International Search Report and Written Opinion for International Application No. PCT/US2015/013583, 7 pages, mailed Jun. 4, 2015.
Office Action for related U.S. Appl. No. 14/329,484, 14 pages, mailed Aug. 10, 2015.

* cited by examiner

SPUN NON-CIRCULAR AND NON-ELLIPTICAL CORE OPTICAL FIBERS AND APPARATUSES UTILIZING THE SAME

CROSS-REFERENCE TO RELATED APPLICATION

This application claims the benefit of U.S. Provisional patent application 61/800,970 filed Mar. 15, 2013, the contents of which are incorporated herein by reference in their entirety.

BACKGROUND OF THE INVENTION

1. Field of the Invention

Generally, the field of the present invention is optical fibers. More particularly, the present invention relates to large mode area optical fibers and single-mode operation thereof.

2. Background

It is of increasing importance for industry to keep pace with the progress of small-scale technology. With the ability to process a variety of materials and at small-scales, laser systems are well suited for precision processing applications in corresponding technologies. In particular, high power fiber lasers are well-suited for such precision applications due to their compactness, efficiency, cost-effectiveness, and potential for single-mode performance, among other advantages. However, to increase the power capabilities of such systems that utilize optical fiber, various roadblocks exist. For example, in some approaches, the power scaling of fiber lasers requires large mode area fiber to provide single-mode performance, even as the core size of such fibers increases to diameters outside practical single-mode ranges, such as approximately 25 μm or less. The onset of higher order modes tends to significantly deteriorate the beam quality of the output beam from the fiber, resulting in less than optimal performance and limiting output power scaling. Various approaches that have been developed to push the power barrier have met with mixed results, remain under development, or are very expensive. Accordingly, there remains a need for fiber laser systems capable of scaling to higher powers.

SUMMARY OF THE INVENTION

In order to scale fiber laser systems to higher powers, novel optical fibers have been designed, and are disclosed herein, which allow the use of large core large mode area fibers in fiber laser systems that remain capable of single mode operation or that otherwise provide substantial suppression of higher order modes. In particular, a novel optical fiber includes a non-circular and non-elliptical central core structure that is rotated about an axis thereof. The non-circular and non-elliptical core structure breaks the rotational symmetry of conventional optical fibers, and provides the possibility of modal discrimination while the rotation of the core about the axis of the fiber provides modal scrambling and coupling. The combination of the two produce modal discrimination as the core size, and corresponding beam power, is scaled outside the single mode regime. For optical fibers herein having different large core sizes, particular rotational periods can be varied and selected for which the fundamental mode of the optical fiber has low transmission loss at the operating wavelength band, and the higher order modes of the fiber have high transmission loss. In this way, higher order modes can be effectively suppressed when propagating along the fiber and the fundamental mode will remain unchanged or substantially less affected. Consequently, such a fiber will have a large mode area, and at the same time, continue to provide stable single-mode operation. Optical fibers herein can be manufactured by providing a preform having a non-circular and non-elliptical core cross-section, and then drawing such preforms at predetermined spin rates corresponding to desired modal discrimination performance.

According to other aspects of the present invention, fiber lasers and fiber amplifiers are provided which are capable of being scaled to very high powers while maintaining single-mode operation. In accordance with still further aspects, spectral filters are provided which can enable further power scaling of fiber lasers and fiber amplifiers and can provide additional benefits to cascaded Raman amplifiers.

The foregoing and other objects, features, and advantages will become more apparent from the following detailed description, which proceeds with reference to the accompanying figures, which are not necessarily to scale.

DETAILED DESCRIPTION OF THE INVENTION

Figure 1:
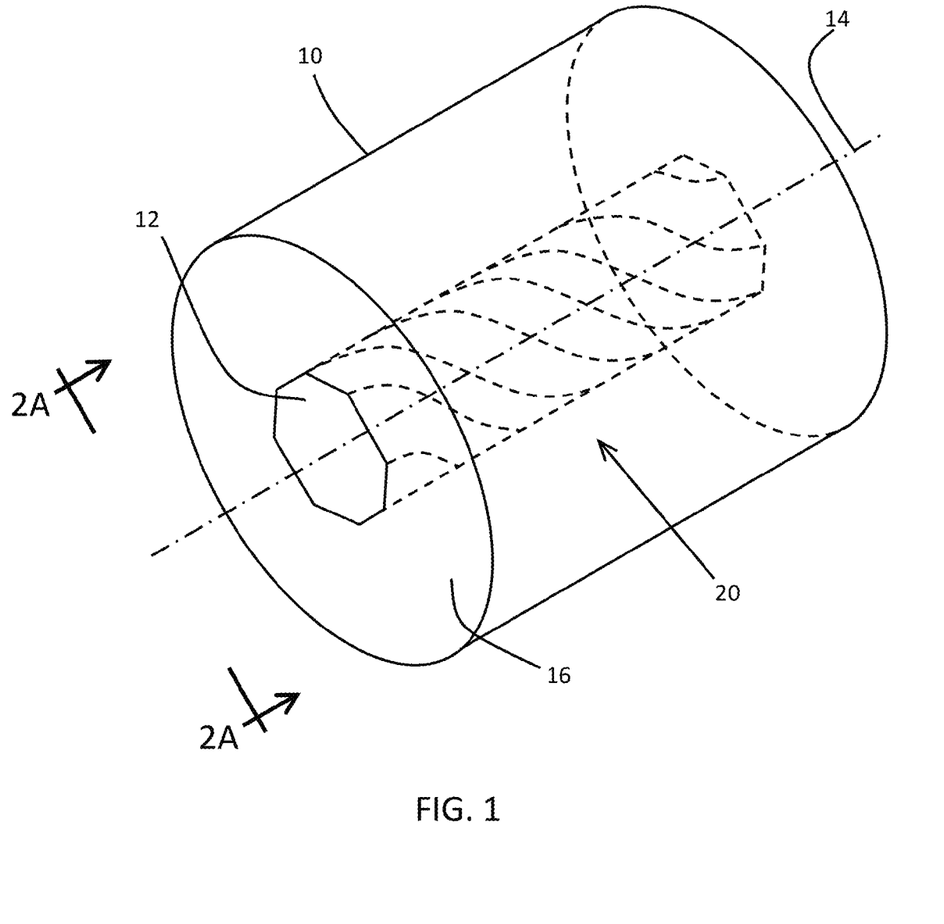
FIG. 1 is a perspective view of a section of optical fiber in accordance with an aspect of the present invention.
Figure 2A:
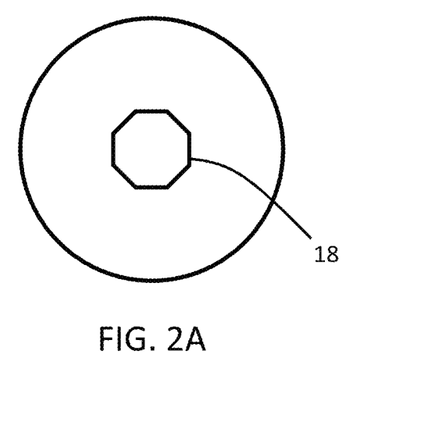
FIG. 2A is a cross-sectional view of the optical fiber shown in FIG. 1.

Referring now to FIGS. 1 and 2A, an optical fiber 10 is shown in accordance with an aspect of the present invention. The optical fiber 10 includes a central core 12 disposed substantially aligned with a central longitudinal axis 14 of the fiber 12. Around the central core 12 is a cladding 16. The core 12 has a non-circular and non-elliptical geometry, which in one aspect, as shown, has an octagonal configuration 18. Other geometries are possible, as will be discussed later. The cladding 16 surrounding the core 12 has a circular outer diameter geometry, though other structures are possible and in many cases preferred. As shown, the optical fiber 10 is a double-clad optical fiber, particularly suited for fiber laser systems. Other types of configurations are possible, such as triple-clad fiber configurations, and some elements are omitted for simplicity, such as a sleeve or coating surrounding the cladding 16. The core 12 of the optical fiber 10 may be active or passive, depending on the particular application or use. In typical examples, the core 12 is large in diameter as compared to conventional optical fibers, such as greater than 20 μm, 50 μm, 80 μm, or even 100 μm.

The central core 12 of the optical fiber 10 is preferably a large mode area core which could support higher order modes than the fundamental mode of a propagating beam. However, the optical fiber 10 has been fabricated in such a way that the core structure is not static along the longitudinal axis 14 of the fiber 10. In preferred examples the cross-section structure rotates azimuthally about the longitudinal axis 14 along the length of the optical fiber 10 at a predetermined frequency to form a rotated structure 20. The rotated structure 20 in constant rotation embodiments is characterized by a pitch, or period, optimized for modal discrimination. For example, as shown in FIG. 1, approximately one pitch length of rotated core structure 20 is shown for optical fiber 10. The pitch length can be varied in accordance with the present invention and for different effects. For example, a constant rotated core pitch can continuously or step-wise increase or decrease in a slow or rapid fashion. Moreover, different pitch frequencies can be combined to form a core structure that is rotated in an uneven way.

Figure 2B:
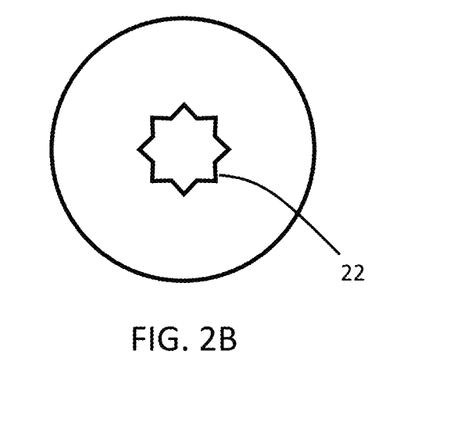
FIG. 2B-2F show additional cross-sectional views of optical fibers in accordance with other aspects of the present invention.
Figure 2C:
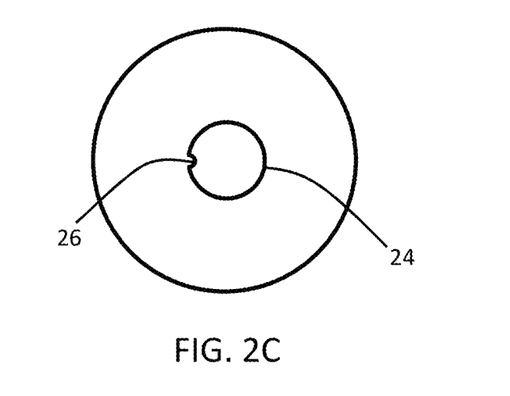
Figure 2D:
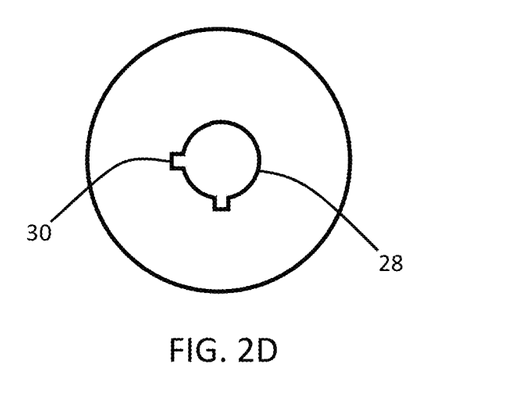
Figure 2E:
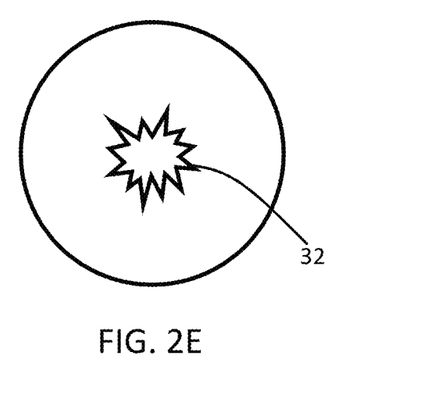
Figure 2F:
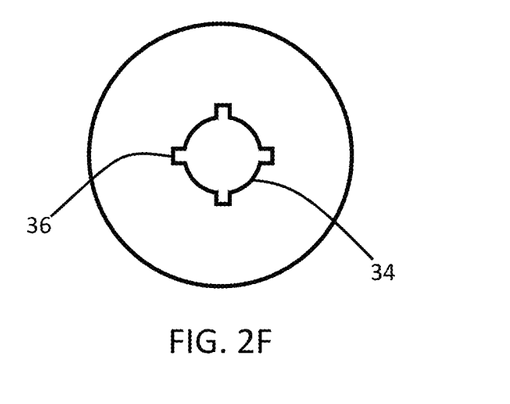

Referring now to FIGS. 2B-2F, various cross-sectional geometries are shown consistent with additional aspects of the present invention. In general, various shapes are possible and within the spirit and scope of the present invention. Polygonal shapes may be preferred for ease of manufacture. In FIG. 2B, a cross-section of an optical fiber is shown where a core 22 thereof has an octagonally starred configuration. Other polygons can include squares, rectangles, pentagons, hexagons, etc. In FIG. 2C, a cross-section of an optical fiber is shown where a core 24 thereof has a small notch 26 along the circumference of the core 24. In FIG. 2D, a cross-section of an optical fiber is shown where a core 28 includes one or more core protrusion features 30 at selected positions along the circumference of the core 28. In FIG. 2E, a cross-section of an optical fiber is shown where a core 32 includes a random or asymmetric configuration of features about the circumference of the core 32. In FIG. 2F, a cross-section of an optical fiber is shown where a core 34 includes core protrusion features 36 symmetrically disposed about the circumference of the core 34. For different cross-sectional geometries, optical modes may evolve and interact differently therein, and beam propagation simulations can be utilized to optimize rotational pitch of the core for desired modal discrimination effects.

Figure 3A:
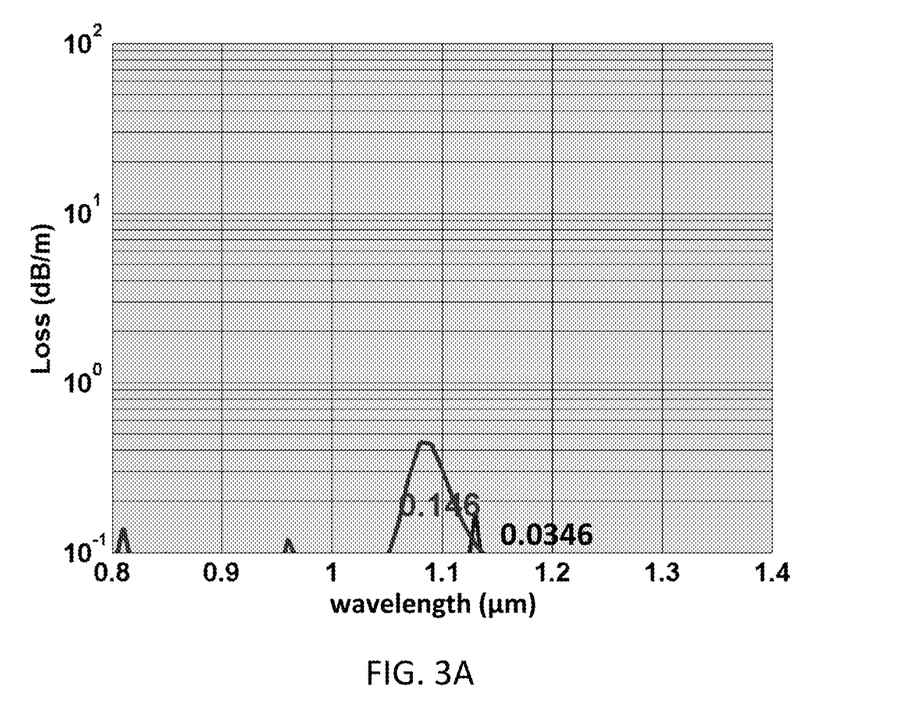
FIG. 3A is plot of optical transmission loss spectra.
Figure 3B:
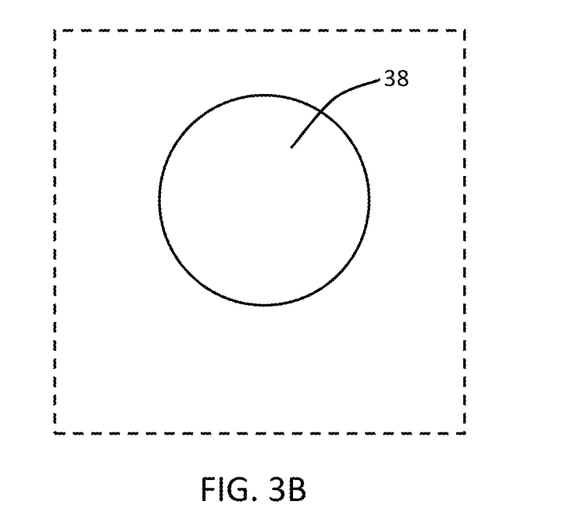
FIG. 3B is a cross-sectional view showing a fiber in accordance with the optical transmission loss spectra shown in FIG. 3A.
Figure 4A:
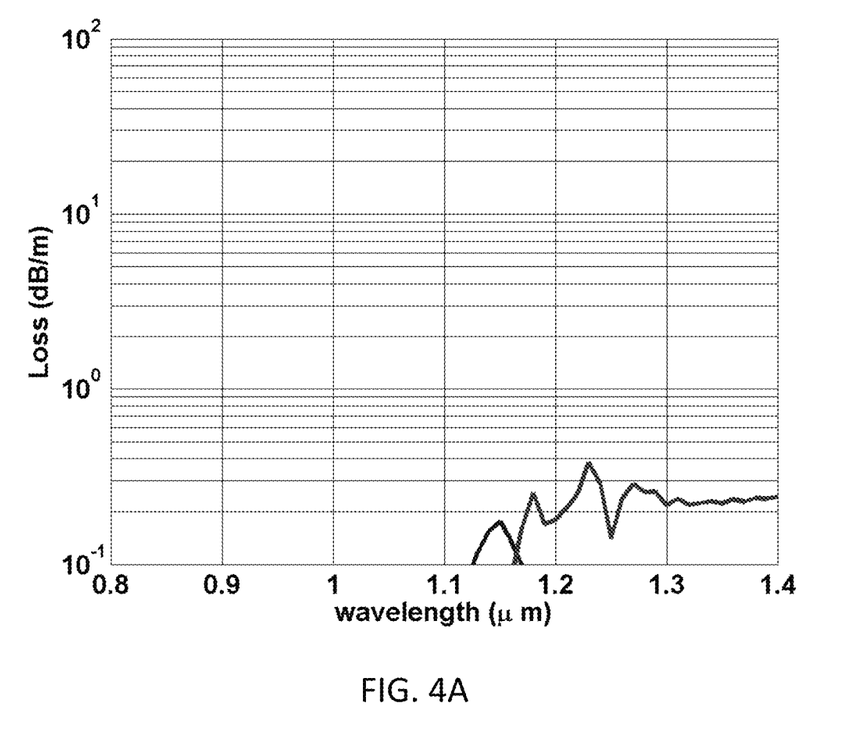
FIG. 4A is plot of optical transmission loss spectra.
Figure 4B:
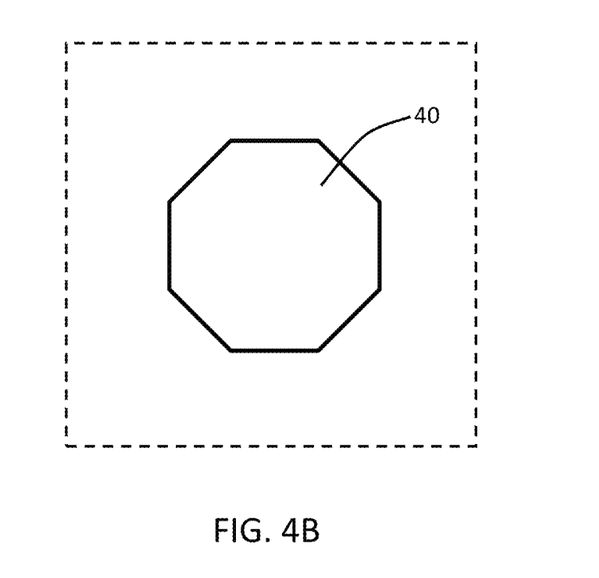
FIG. 4B is a cross-sectional view showing a fiber in accordance with the optical transmission loss spectra shown in FIG. 4A.
Figure 5A:
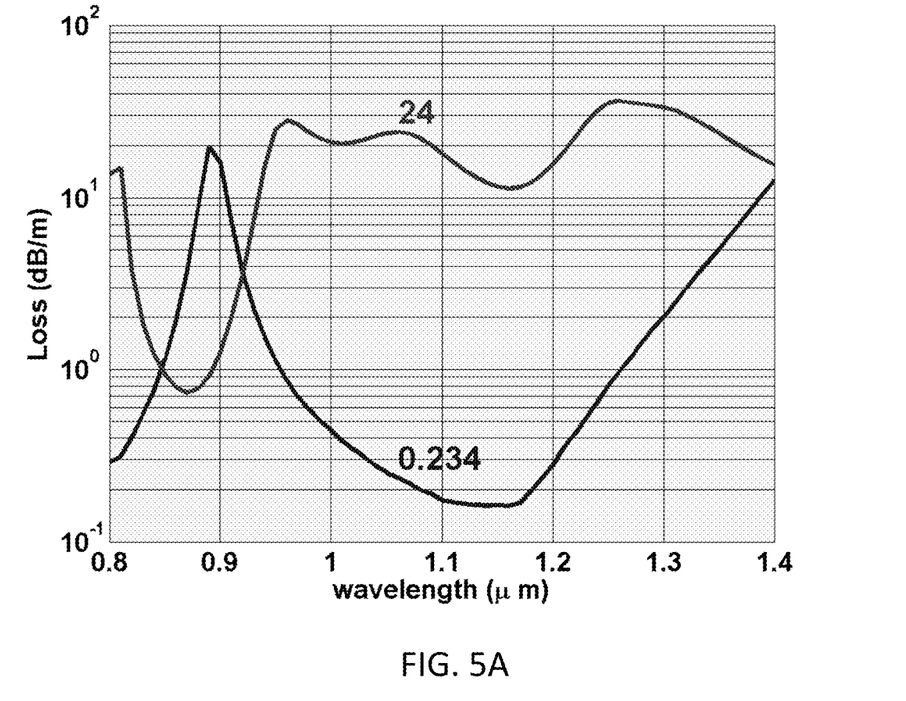
FIG. 5A is plot of optical transmission loss spectra in accordance with an optical fiber in accordance with an aspect of the present invention.
Figure 5B:
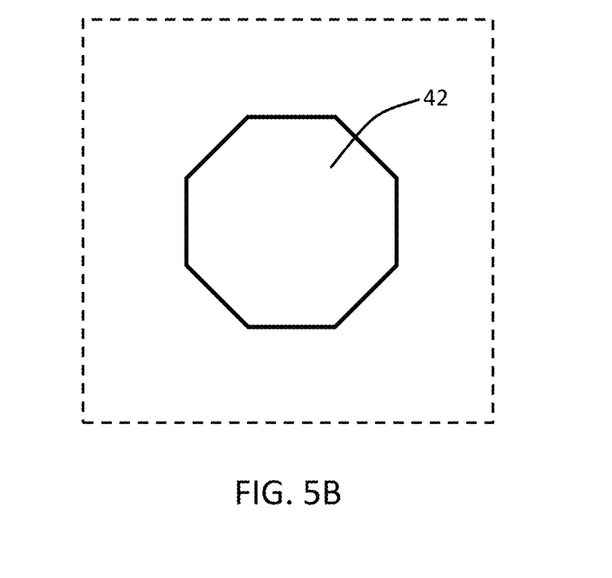
FIG. 5B is a cross-sectional view showing a fiber in accordance with the optical transmission loss spectra shown in FIG. 5A.

For example, now referring to FIGS. 3-5, a fiber design is shown in three different simulations. In each simulation the edge-to-edge size (or diameter) of the core is 56 μm, substantially larger than the single-mode regime of ordinary step-index fibers propagating optical fluxes at 1064 nm. Core numerical aperture as shown is 0.068 and the core is passively doped with Germanium. FIG. 3B shows a cross-section of a conventional fiber with a circular core 38. FIG. 3A shows transmission loss spectra for the same conventional circular core fiber that has been rotated about the longitudinal axis of the fiber at a pitch of 4.7 mm. Generally, rotational pitch does not substantially affect or change the propagation of optical modes therethrough given the azimuthal symmetry in circular cores 38. Accordingly, both the fundamental $LP_{01}$ mode and the next higher order mode $LP_{11}$, which also represents other higher order modes as well, indicate low transmission loss over a wide optical spectrum at 0.146 and 0.0346 respectively. An optical beam at an output of the fiber would include substantial undesirable higher order mode content.

In FIG. 4B a cross-section is shown for an optical fiber with an octagonal core 40. In this example, the fiber core 40 has not been rotated. Referring then to FIG. 4A, the transmission loss spectra is shown for the fiber with a non-rotated octagonal core 40. Similar to the fiber example with a circular core 38 in FIG. 3A, the non-rotated octagonally cored fiber experiences low transmission loss over the wide optical spectrum. An optical beam at an output of the fiber would include substantial undesirable higher order mode content. Accordingly, neither the rotation of the core nor the non-circular, non-elliptical core structure alone provides desired modal discrimination. Referring now to FIG. 5B, an cross-section of an optical fiber with an octagonal core 42 is shown that is similar to octagonally cored cross-section shown in FIG. 4B, except that the core structure 42 has been rotated at a pitch of 4.7 mm along the length of the fiber. As shown in FIG. 5A, the optical transmission loss spectra for the $LP_{01}$ mode remains very low, at approximately 0.3 dB/m or less in an operating wavelength band around 1060 nm. Also shown in FIG. 5A, the optical transmission loss for the lowest higher order mode $LP_{11}$ is more than 20 dB/m. Other higher order modes have similar or higher loss. Such large higher order mode suppression can ensure the optical fiber works effectively as a single-mode fiber capable of propagating and emitting an optical beam with a very large mode area. Moreover, in many examples, such single mode operation is robust against imperfect launching condition, as well as other external perturbations.

In some examples of optical fibers of present invention, glass fibers are used, while in others, silica, ZBLAN, or plastic fibers are used. Moreover, while step-index fibers have been shown for simplicity, other refractive index profiles may be used, including parabolic, multi-step, triangular, depressed, graded, etc. As mentioned hereinbefore, optical fibers in accordance with the present invention may be active or passive. Active fibers may include Yb-doped, Er-doped, Er-Yb-Codoped, Tm-doped, Ho-doped, Nd-doped, Bi-doped, as well as other dopants. Passive fibers typically include Ge-doped, Al-doped, multiple-ion-codoped, or other dopant combinations. In some embodiments optical fibers may be photosensitive. Cladding configuration for optical fibers herein may be circular as shown, or other than circular, including elliptical, polygonal, rectangular, D-shaped, flower-shaped, and irregular. Some examples of optical fibers may include single- or multiple-layer coatings, such as acrylate, silicone, polymer, carbon, metal, nanoparticles, etc., while other examples may omit coatings. Optical fibers in accordance with some examples of the present invention can support linear, circular, elliptical, radial, azimuthal, or combinations thereof, vortex, or complex polarization states. In some examples, rod-type fibers having short lengths and large clad sizes may be used. Also, some optical fiber examples can include longitudinally tapered fibers having varied clad or core size (or both) along the fiber axis.

Some manufacturing methods in accordance with the present invention include sleeving the core rod preform by using an octagonal (or other preselected non-circular and non-elliptical core structure) inner hole sleeving tube. The optical fiber is then drawn slowly while spinning the preform at a predetermined or dynamically controlled rate.

Figure 6:
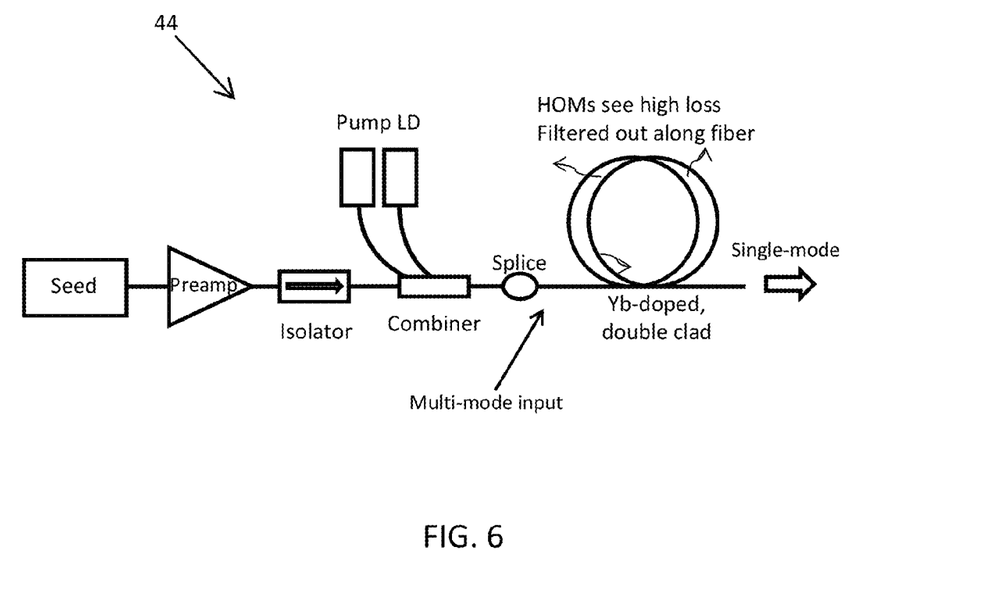
FIG. 6 is a schematic of a fiber amplifier system in accordance with an aspect of the present invention.

Different examples of optical fiber in accordance with the present invention can be useful for many types of fiber laser and fiber amplifier systems. Such systems will tend to benefit significantly from the novel fiber herein, particularly with respect to beam quality, pointing stability, nonlinear effects, and material damage threshold. One example of a fiber laser system in accordance with the present invention which utilizes the fiber described herein is shown in FIG. 6 and is generally designated 44. A pulsed seed source laser is operable to provide relatively low power laser pulses at a predetermined pulse width and repetition rate. For example, one suitable pulse width may be 100 ps and a suitable repetition rate may be 10 MHz. Other seed sources may be used that are characterized by other pulse widths and repetition rates. In typical examples, one or more pre-amplification stages are used to amplify the average power of the laser pulse to a few Watts. One or more optical isolators are also used between stages to prevent undesirable feedback.

A pump combiner is configured to couple pump light from one or more pump laser diodes into the cladding of a passive optical fiber, and to couple the signal light from the amplified seed source into the core of passive optical fiber. The passive fiber may then be spliced to an exemplary active optical fiber of the present invention. Alternatively, the passive fiber may also be an optical fiber of the present invention. The active fiber may have an octagonal core configuration or another core structure in accordance with the present invention. The active fiber has a rotated core structure with a predetermined pitch of 5 mm as described herein, and large diameter core, such as 60 μm. Other pitches and core diameters may be used.

In a preferred example, the active optical fiber is 3 m in length, Yb-doped, and double-clad. Such an optical fiber, in accordance with the present invention, is configured to provide low optical transmission loss for the $LP_{01}$ mode, such as 0.2 dB/m, and high optical transmission loss for all higher order modes, such as greater than 20 dB/m, at an operating wavelength of approximately 1060 nm. In examples where a splice point may excite multiple modes due to mode field mismatch and large core size, higher order modes will continue to experience high transmission loss and will therefore be suppressed. An output optical beam is characterized by high gain and single mode propagation. Corresponding mode field diameters of output beams can exceed 50 μm, increasing the nonlinear effect threshold by about 5-fold compared to conventional large mode area fibers, which typically reach a maximum mode field diameter of 22 μm.

Figure 7A:
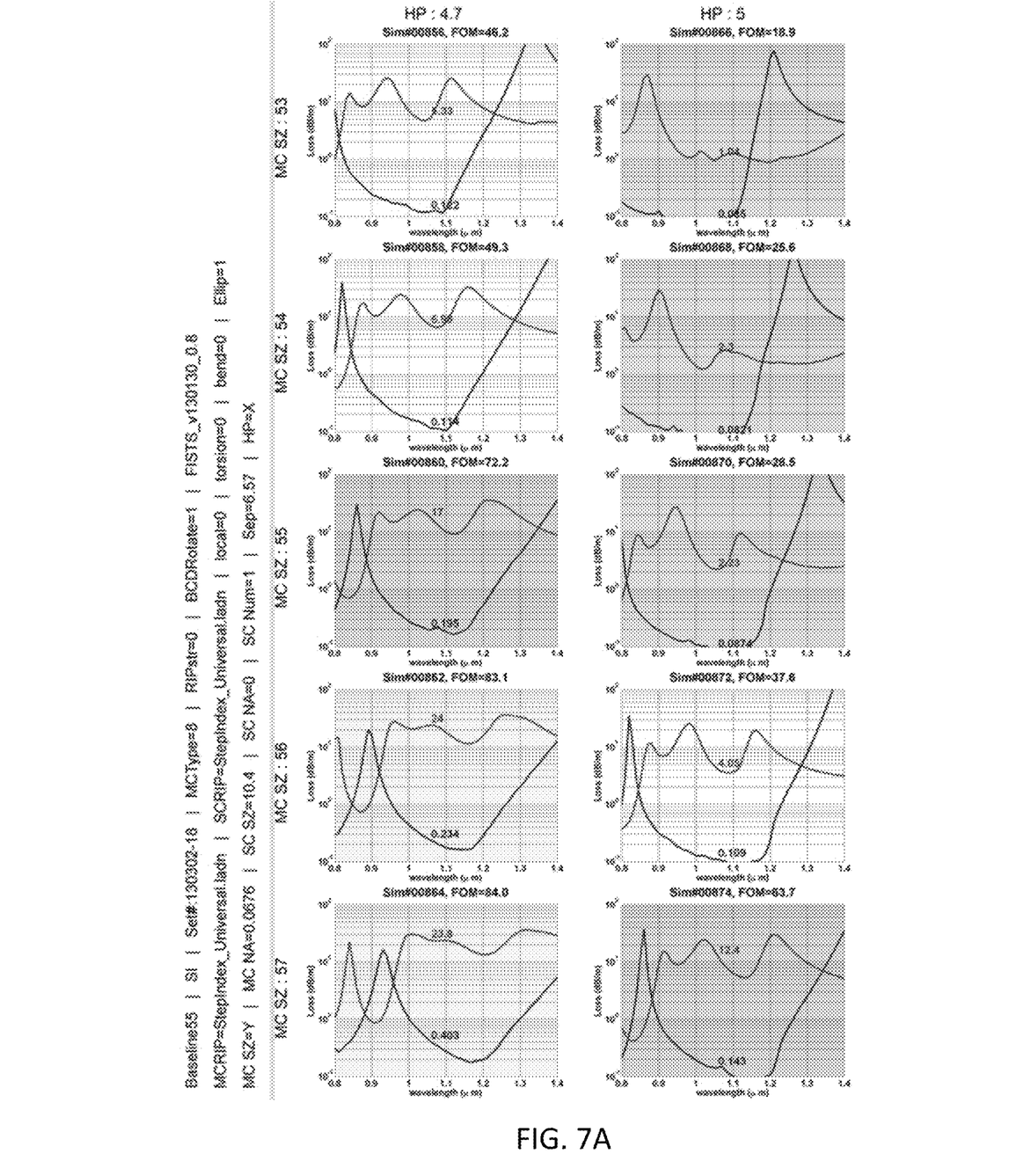
FIG. 7A shows several plots of optical transmission loss spectra for various optical fiber configuration in accordance with an aspect of the present invention.
Figure 7B:
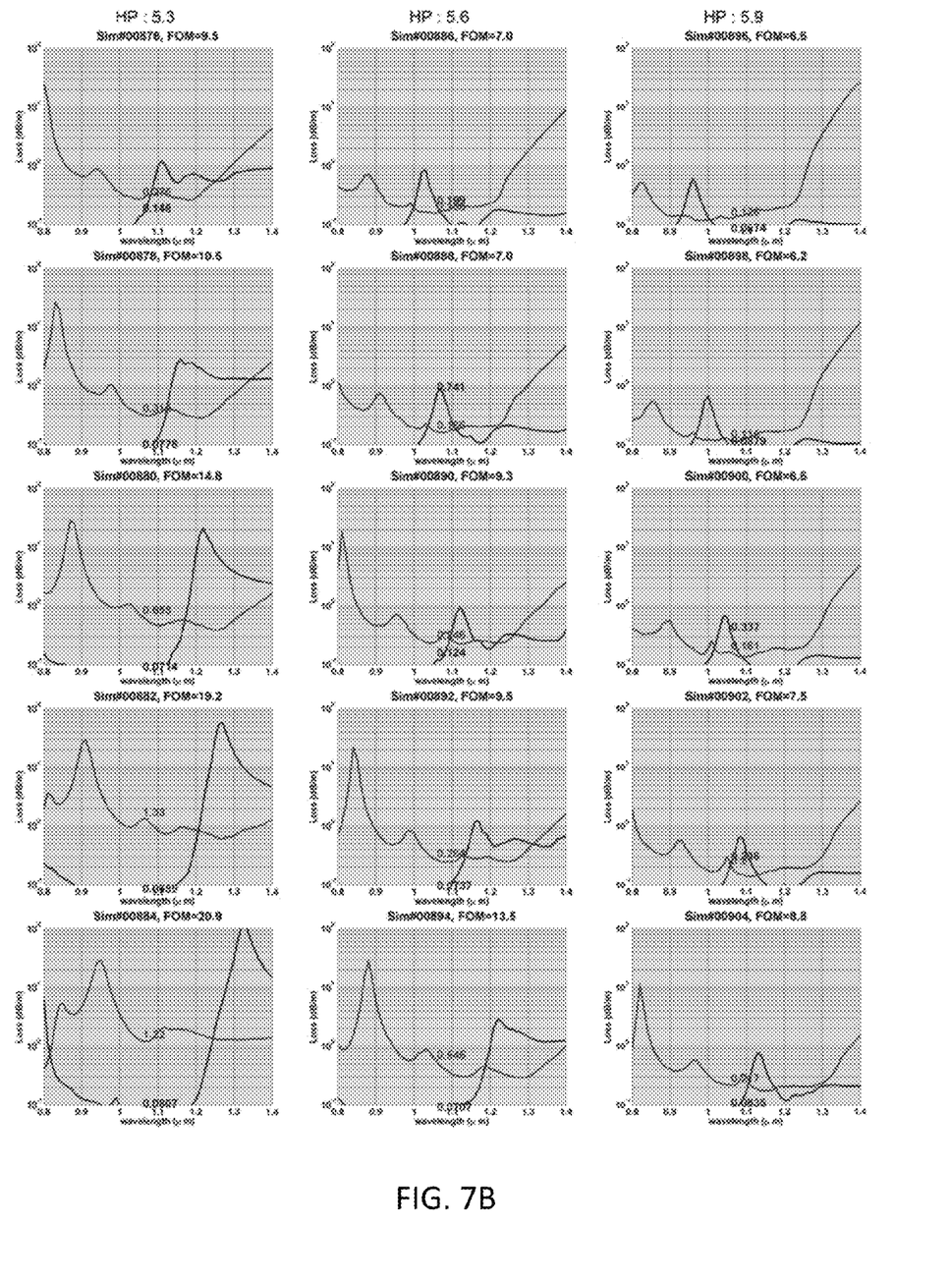
FIG. 7B shows several additional plots associated with FIG. 7A and extending to the right thereof, in accordance with an aspect of the present invention.

Some optical fiber examples of the present invention may be used for spectral filtering. In reference to FIGS. 7A and 7B, multiple plots are shown of spectral response for different core rotation pitch and core structure. FIG. 7A shows a first column of five spectral response charts at different core sizes for a particular rotational pitch of 4.7 mm and a second column of five spectral response charts at different core sizes for a slightly larger rotational pitch of 5 mm. FIG. 7B shows three additional columns of five charts for different core sizes as listed in FIG. 7A for three larger helical pitches of 5.3 mm, 5.6 mm, and 5.9 mm. The optical transmission loss associated with the $LP_{01}$ mode demonstrates a sharp spectral response and is variable with respect to core size and rotational pitch. Accordingly, the optical fiber core structure and core rotation pitch can be configured to provide spectral filtering. Corresponding spectral filtering can be used for fiber lasers, fiber amplifiers, as well as for passive optical components.

In one application of spectral filtering in accordance with the present invention, an optical fiber is configured to have low optical transmission loss at 1064 nm and a high optical transmission loss at 1110 nm, which is near or is approximately the stimulated Raman scattering (SRS) shifted wavelength. As implemented in a fiber laser or fiber amplifier operating at high power, the SRS effect will be significantly suppressed, and the power scaling limitation due to SRS can be overcome.

Figure 8:
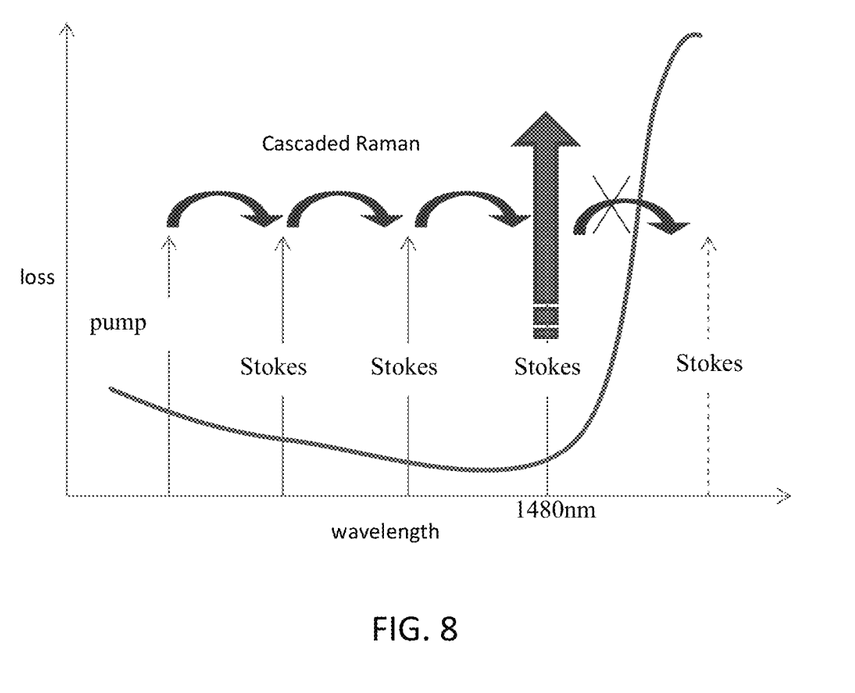
FIG. 8 is a chart schematic depicting performance of a cascaded Raman amplifier in accordance with an aspect of the present invention.

In another example, and now with reference to FIG. 8, an optical fiber can be configured in accordance with the present invention to provide low optical transmission loss between 1100-1480 nm, and a high loss at longer wavelength. When the optical fiber in accordance therewith is implemented in a cascaded Raman amplifier, the spectral cutoff effect after 1480 nm will eliminate further cascaded stokes generation, and enhance output at 1480 nm.

In another example, a Yb-doped optical fiber of the present invention can be configured to have low optical transmission loss at a laser signal wavelength, such as 1064 nm and high optical transmission loss at an amplified spontaneous emission (ASE) band, approximately between 1020-1050 nm. The corresponding optical fiber can then operate as an ASE filter. By implementing such an optical fiber in a fiber laser or fiber amplifier, ASE noise can be significantly suppressed such that build-up of ASE will be reduced or the ASE threshold will be significantly higher. By mitigating ASE, the optical fiber can enhance laser performance and enable further power scaling of the laser system. A similar technique may be applied for suppression of ASE near 1000 nm or spurious lasing in Er-Yb-codoped optical fibers, as well as for suppression of ASE near 1000 nm or spurious lasing in YB-doped fiber lasers and amplifiers operating at 976 nm.

It is thought that the present invention and many of the attendant advantages thereof will be understood from the foregoing description and it will be apparent that various changes may be made in the parts thereof without departing from the spirit and scope of the invention or sacrificing all of its material advantages, the forms hereinbefore described being merely exemplary embodiments thereof.

The invention claimed is:

1. An optical fiber, comprising:
   a central core and a cladding disposed about said central core, said central core having a non-circular and non-elliptical cross-section, said central core rotated about a central axis thereof along the length of the optical fiber;
   wherein said central core cross-section and rotation are selected to provide controllable modal discrimination so that a first set of predetermined optical modes are more attenuated than a second set of predetermined optical modes.

2. The optical fiber of claim 1 wherein a period of said rotation is selected to maximize modal discrimination.

3. The optical fiber of claim 1 wherein said central core has an effective diameter of larger than 25 μm.

4. The optical fiber of claim 1 wherein said central core has an effective diameter of larger than 50 μm.

5. The optical fiber of claim 1 wherein said central core cross-section is octagonal.

6. The optical fiber of claim 1 wherein said central core cross-section is polygonal.

7. The optical fiber of claim 1 wherein the rotation of said central core about said central axis discriminate against modes higher than the fundamental mode.

8. The optical fiber of claim 1 wherein said fiber is a double-clad fiber.

9. The optical fiber of claim 1 wherein said central core is doped with one or more active fiber dopants.

10. The optical fiber of claim 1 wherein said fiber a triple-clad fiber.

11. The optical fiber of claim 1 wherein said fiber provides spectral filtering at selected wavelengths.

12. The optical fiber of claim 1 wherein said fiber provides spectral filtering through selection of fiber parameters including rotational pitch and central core diameter.

13. The optical fiber of claim 1 wherein said fiber is configured to provide a spectral cutoff effect for a cascaded Raman amplifier.

14. An optical system, comprising:
a seed optical source configured to provide a seed beam; and
an optical amplifier configured to receive and amplify the seed beam, said optical amplifier including an active, non-PCF (photonic crystal fiber), optical fiber having a large mode area non-circular and non-elliptical core cross-section rotated about a central axis of said active optical fiber along the length thereof;
wherein said core cross-section is selectively rotated to provide controllable modal discrimination so that a first set of predetermined optical modes of the optical amplifier are more attenuated than a second set of predetermined optical modes of the optical amplifier.

15. The optical system of claim 14 wherein an output beam is produced that is substantially in the fundamental mode.

16. The optical system of claim 14 wherein a period of rotation of said rotated core is selected to maximize modal discrimination.

17. The optical system of claim 14 wherein said rotated core has an effective diameter of larger than 25 μm.

18. The optical system of claim 14 wherein said rotated core has an octagonal cross-section.

* * * * *